May 5, 1931.  C. L. BROWN  1,804,312
AIRCRAFT MOTOR AND MOUNTING
Filed April 29, 1930   3 Sheets-Sheet 1

INVENTOR.
Charley L. Brown
BY Lancaster Allwine and Rommel
ATTORNEYS.

May 5, 1931.  C. L. BROWN  1,804,312
AIRCRAFT MOTOR AND MOUNTING
Filed April 29, 1930  3 Sheets-Sheet 2

INVENTOR.
Charley L. Brown

BY *Lancaster Allwine and Rommel*
ATTORNEYS.

May 5, 1931.  C. L. BROWN  1,804,312
AIRCRAFT MOTOR AND MOUNTING
Filed April 29, 1930  3 Sheets-Sheet 3

INVENTOR.
Charley L. Brown
BY Lancaster, Allwine and Rommel
ATTORNEYS.

Patented May 5, 1931

1,804,312

UNITED STATES PATENT OFFICE

CHARLEY L. BROWN, OF RUSHVILLE, MISSOURI

AIRCRAFT MOTOR AND MOUNTING

Application filed April 29, 1930. Serial No. 448,364.

This invention relates to improvements in power plant equipment for aircraft.

The primary object of this invention is the provision of an improved internal combustion engine structure for aircraft, particularly relating to an improved mounting for the same upon the aircraft in an out-board arrangement; the motor arrangement having improved means to compensate for torque incident to propeller rotation, without the necessity of compensating guidance of the aircraft by means of control surface arrangement.

A further object of this invention is the provision of an improved torque compensating motor particularly well adapted for outboard mounting; the motor embodying characteristics as set forth in my co-pending application, Serial No. 384,778.

A further object of this invention is the provision of improvements in means for mounting propellers in relation to the other parts of an internal combustion engine.

A further object of this invention is the provision of improved means for controlling an out-board motor of the type to be subsequently described, with improved means for regulation of oil and fuel flow thereto and therefrom.

Other objects and advantages of this invention will be apparent during the course of the following detailed description.

In the accompanying drawings, forming a part of this specification, and wherein similar reference characters designate corresponding parts throughout the several views.

Figure 3:
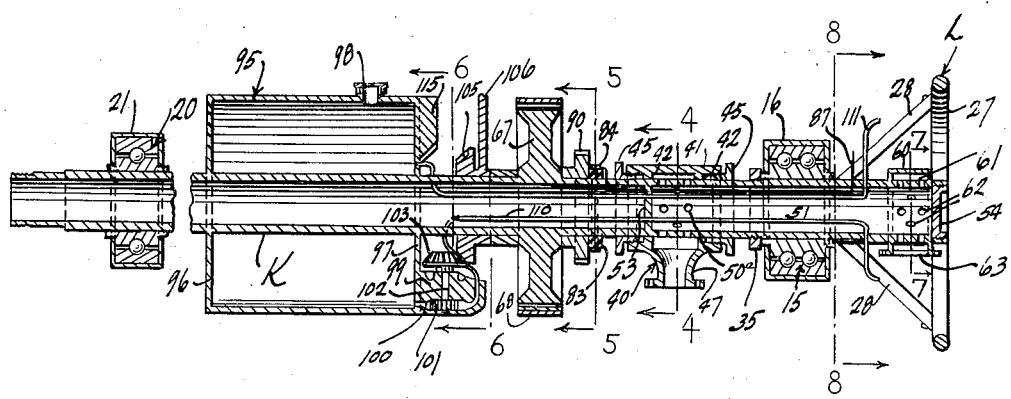
Figure 3 is an enlarged longitudinal sectional view taken through essential parts of the improved motor and its mounting.

Figures 4, 5, 6, 7, and 8 are transverse sectional views taken substantially on their respective lines in Figure 3 of the drawings.

Figure 9:
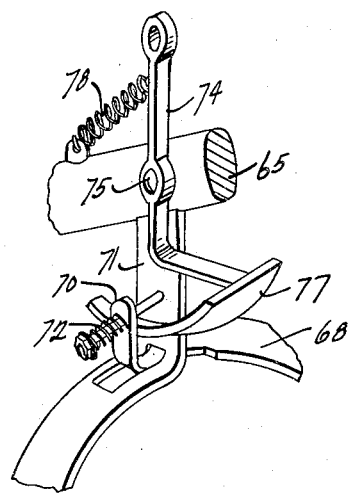

Figure 9 is a fragmentary perspective view of an improved brake used for regulating motor feed and relative control of propellers thereof.

Figure 10:
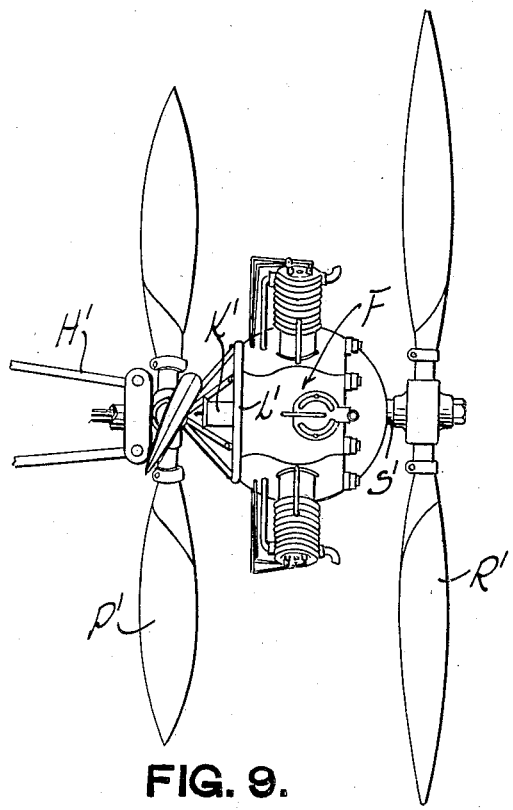

Figure 10 is a modified form of propeller mounting for the improved internal combustion engine structure.

Figure 11:
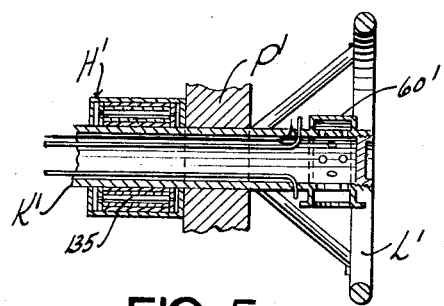
Figure 5:
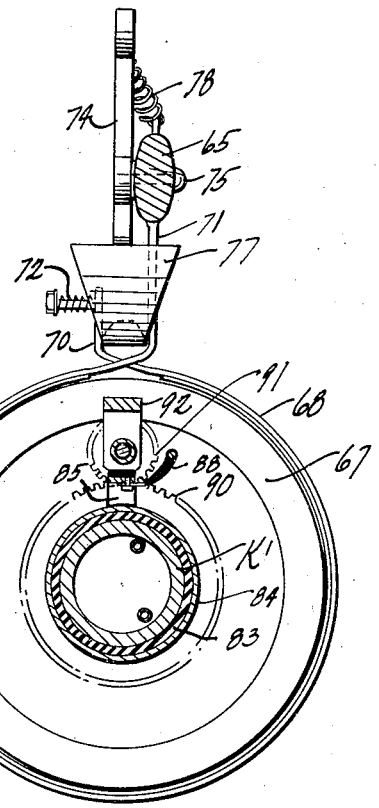

Figure 11 is a fragmentary sectional view taken longitudinally of the axis of the motor and propeller arrangement of Figure 10.

Figure 1:
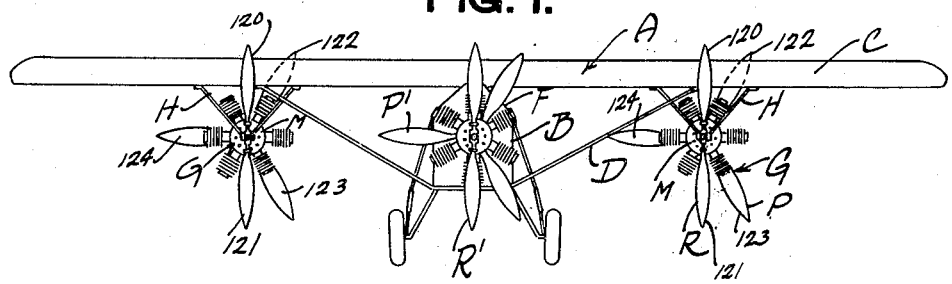
Figure 1 is a front elevation of an airplane of the monoplane type, showing the power plant equipment associated therewith, including fuselage and out-board motors.
Figure 8:
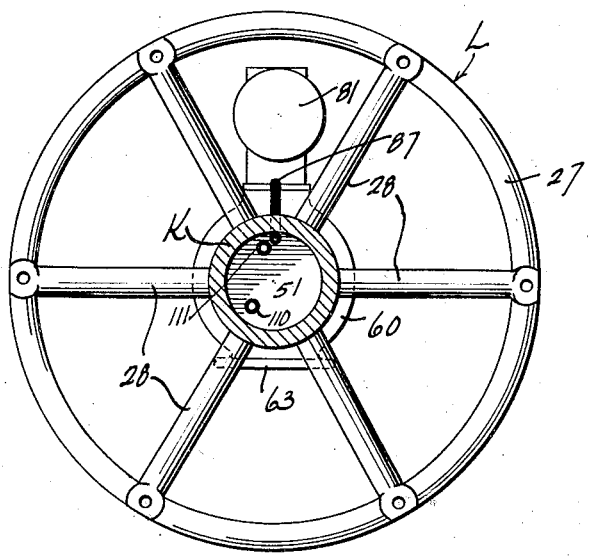

In the drawings, wherein for the purpose of illustration are shown preferred and modified forms of the invention, the letter A may generally designate an aircraft, which in the particular instance shown is of the monoplane-airplane type. It includes the fuselage B having the plane C appropriately connected thereto by suitable struts D. A fuselage power plant may be mounted substantially axially of the fuselage at the front thereof, of the type set forth in my co-pending application above mentioned, or an improved internal combustion engine and motor mounting F may be employed, as shown in Figures 1, 10 and 11 of the drawings. The improved out-board internal combustion engine and propeller structures G may be mounted on the wing of the aircraft C laterally at each side of the fuselage. These out-board motors may be mounted on top of the wing or in any other approved out-board arrangement.

In the out-board arrangement G, a frame H for mounting of the power plant is fixedly connected with the aircraft, preferably the wing C, which supports a shaft K rotatable thereon. The shaft K has connected therewith a frame L which directly supports a rotary motor M in such relation that the motor M may rotate with the tube K. The latter is provided with a propeller P keyed therewith which also rotates with the motor M. The engine or motor M has a main propeller R connected to the crank shaft S of the motor M.

The motor M may be of the rotary air-cooled type, and in the instance shown the motor is of the six-cylinder Anzani type. Suffice to say that it has the crank shaft S with the main propeller R operatively keyed directly thereto at the front of the motor.

Figure 2:
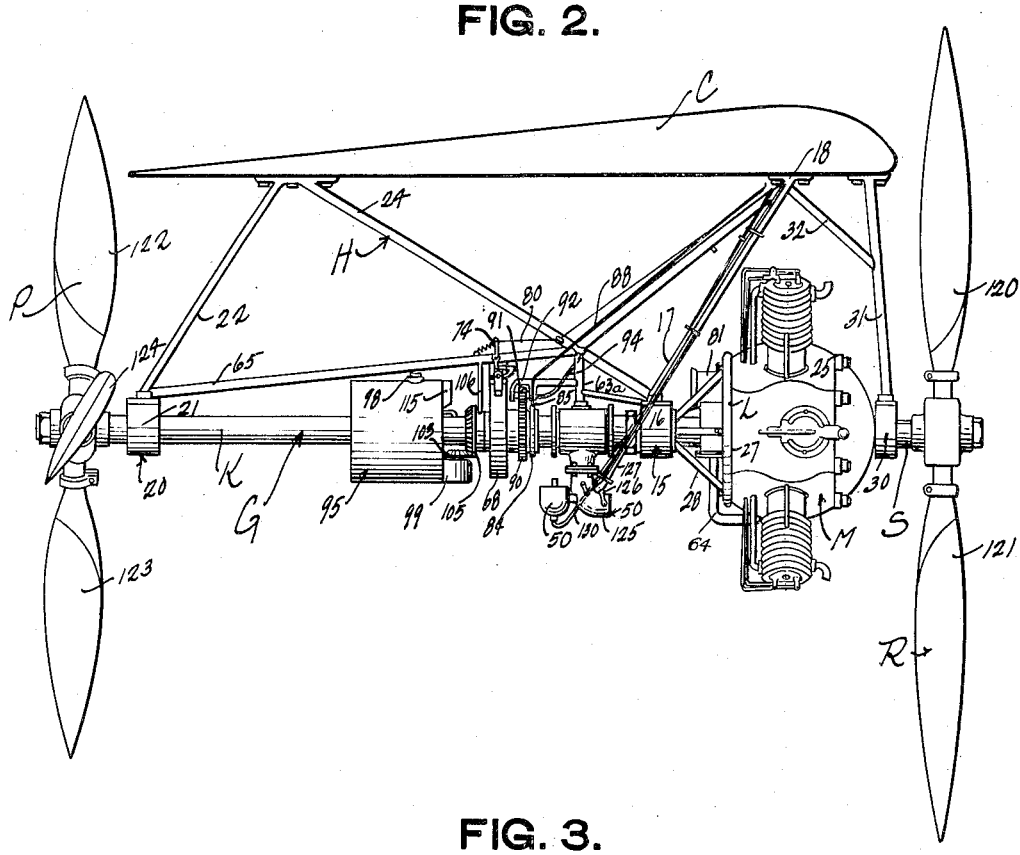
Figure 2 is a side elevation of one of the out-board motors in its relation to the plane of the aircraft.

The hollow shaft or tube K is sufficiently strong to support the various units attached herewith, and at its forward end it is provided with an anti-friction bearing 15 mounted in a stationary casing 16; the latter being affixed to a depending main strut 17 comprising part of the mounting frame H. This strut 17 is connected at 18 to the lower part of the front of the wing C and may be of V-shaped formation with the bearing casing 16 at its lower end, as can be understood from Figures 1 and 2 of the drawings. A second anti-friction bearing 20 is rearwardly supported at the rear end of the hollow shaft K, having a stationary casing 21 which is connected by means of a rear strut device 22, comprising part of the mounting means H, and attached to the wing C as shown in Figure 2.

The mounting means H furthermore includes an intermediate diagonal main strut 24 extending from its connection with the wing C adjacent the point where the strut 22 is connected downwardly and forwardly and at its lower end it has fixed connection with the stationary casing 16 of the bearing 15, and with the lower end of the front strut 17 above described. These struts 17, 22, and 24 may each be of the V-type if desired.

The casing 25 of the internal combustion engine M is directly connected to the tube K by the mounting frame L. The latter may comprise a main body 27 of ring-shaped formation, which is fixed concentric with the shaft K at the forward end of the latter by means of rearwardly extending and relatively converging struts or spokes 28, the rear ends of which are welded or otherwise rigidly affixed directly to the exterior of the tube K. At the juncture of the spokes 28 with the ring 27, means is provided as in conventional construction for receiving bolts by means of which the motor casing 25 may be attached. This arranges the motor crank shaft S axially at the front of the hollow shaft K.

The crank shaft S at its forward end beyond the motor casing 25 is provided with a bearing 30 having a stationary outer casing which is held stationary and supported by means of a strut 31. The latter is of the V-shaped type, comprising part of the main mounting frame H and it is connected to the front of the wing C. It may be diagonally braced at 32, as shown in Figure 2, if desired.

The shaft K has a nut 35 thereon at the opposite side of the bearing 15 with respect to the mounting L for holding the bearing 15 in place on said shaft.

To the rear of the bearing 15 a carburetor mounting and intake casing 40 is provided, which consists of a cylindrical body portion 41 having anular spaced ribs 42 therein through which the shaft K extends to space the body 41 between these ribs from the tube K, as shown in Figure 3. The ends of the body 41 are internally screw threaded for receiving packing nuts 45, which are of the ring type and slipped upon the shaft K and adapted to compress packing material between them and the ribs 42 to prevent leakage of fuel. The casing 40 is provided with a depending connection 47 to which the carburetor 50 is connected in usual manner at the intake end of the carburetor. The shaft K is provided with a series of ducts 50$^a$ therethrough at a location between the ribs 42 to permit fuel to enter from the annular passageway within the casing 40 into the passageway 51 through the shaft K. This passageway 51 is blocked or sealed to the rear of the ducts 50$^a$ by means of a partition 52. At the extreme front end the hollow tube K is sealed by a detachable cap nut 54, shown in Figure 3. It is apparent that the carburetor 50 feeds the vaporized fuel into the casing 40 and through the ducts 50$^a$ into the passageway 51. At the forward end of the tube or shaft K there is provided an annular casing 60 welded in place upon the shaft K and providing an annular chamber 61 about the tube which is communicated with the passageway 31 by means of ducts 62 extending through the tube. The chamber 61 has an outlet 63 in the casing 60 to which the intake manifold 64 of the internal combustion engine M is connected, for the purpose of feeding fuel to the cylinders of the engine.

The carburetor casing 40 is held stationary with the shaft K rotatable therein, by means of an auxiliary strut 63$^a$ connected to the main strut 24 between the ends of the latter, as shown in Figure 2 of the drawings. This arrangement may be additionally reinforced by a cross strut 65 extending from the point where the struts 24 and 63$^a$ relatively connect rearwardly to the connection of the strut 22 with the casing 21 of the rear bearing 20, as shown in Figure 2.

A brake is provided for the purpose of variably regulating the speed of rotation of the shaft K, or for holding the same non-rotatable and the motor M non-rotatable in event it is desired that the main propeller R shall perform all of the work of driving the aircraft. This is a feature set forth in my co-pending application above mentioned and need not be further enlarged upon. The brake arrangement preferably consists of a drum 67, integral, keyed, or otherwise affixed to the shaft K, as shown in Figure 3. A brake band 68 is associated with the drum 67, upon the external periphery, and operating means is associated with the ends of this brake band and operatively mounted upon the mounting frame H. As shown in Figure 9 the ends of the brake band 68 are provided with substantially parallel portions 70 and 71 which are normally urged towards each other by a connecting spring arrangement 72, in order to expand the band 68 and permit free rotation of the hollow shaft K.

A lever 74 is pivotally mounted at 75 upon the strut 65. One end of the lever 74 has a tapered cam 77 operatively arranged for movement between the ends 70 and 71 of the brake band, for the purpose of moving them apart against action of the spring 72 and contracting the band upon the drum 67, for partially or entirely preventing rotation of the hollow shaft K. A spring 78 normally holds the cam 77 inoperative. This lever 74 is connected by means of a cable 80 with suitable control mechanism arranged in the cabin of the aircraft; the cable 80 extending along the strut arrangement of the mounting means H, in any approved manner.

In order to short circuit the magneto 81 shown on the engine M in Figure 2 of the drawings, when stopping the motor, an insulation ring 83 is fixed on the shaft K in any approved location, having a copper conductor ring 84 annularly surrounding the same and in non-conductive relation to the shaft. A brush 85, shown in Figure 2 of the drawings, rides on this ring. The ring is conductively connected with the magneto by a wire 87, shown in Figure 3 of the drawings. A wire 88 extends from the brush 85 to the pilot's motor switch, for a purpose which will be readily apparent to those skilled in the art.

The shaft K has a gear 90 keyed therewith, with which a pinion 91 meshes. The latter is supported by means of a brace strut 92 extending from the strut 63 above described. The pinion 91 is axially connected with a flexible tachometer drive shaft 94, shown in Figure 2, which extends to the pilot's instrument board.

Means is provided to pump oil from a suitable receptacle to and from the engine M. This receptacle, shown at 95 in the drawings, is of cylindrical formation, axially arranged rigid upon the shaft K, having end walls 96 and 97 welded or otherwise secured upon the shaft K. A filler cap 98 is provided for the receptacle. Due to centrifugal action it will be necessary to pump lubricant from the receptacle 95 to the motor. To this end the end wall of the receptacle 95 is provided with an extension 99, wherein a passageway 100 is provided, having a duct communication with the outer peripheral portion of the chamber in the container 95. In this chamber 100 the pump gearing 101 is provided, including a drive shaft 102 mounted in the extension 99. The shaft 102 has a pinion 103 thereon adjacent the shaft K, which meshes with a stationary bevel gear 105 which is axially arranged upon the shaft K and held stationary by means of an arm 106 rigid with the strut 65 of the main mounting frame H, as shown in Figure 2. A conduit 110 extends from the chamber 100 at the opposite side of the gearing 101 from the receptacle 95, and projects into the passageway of the shaft K, and extends therealong to adjacent the motor M, where it exits and is suitably connected with the motor for feed of lubricant to the parts thereof. A return conduit 111 extends from the engine into the receptacle 95, for return of lubricant. The motor may have a pump (not shown) for pumping lubricant through the conduit 111 to the container 95. A counter-balance 115 is placed on the receptacle 95 for counter-balancing the weight of the parts detailed on said receptacle, as shown in Figure 3.

Figure 4:
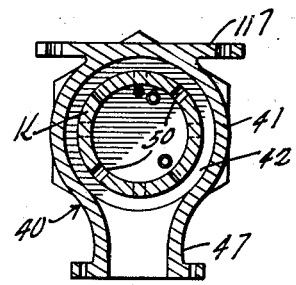
Figure 7:
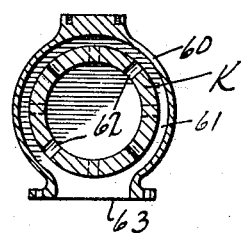
Figure 6:
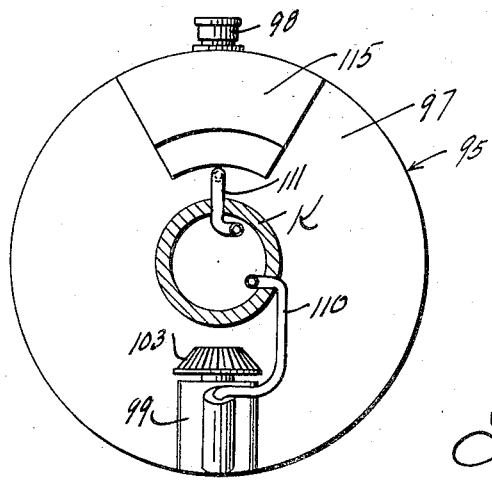

As shown in Figure 4 the top of the fuel intake casing 41 is flat, and flanged as shown at 117, for proper attachment of the strut 63.

The operation of the out-board motor arrangement will be apparent from the foregoing. The main propeller R is of course driven through rotation of the crank shaft in the motor M. Back-pressure in the motor incident to explosion will cause the shaft K to rotate counter to the direction of main propeller rotation, in accordance with that feature of the invention set forth in my co-pending application above referred to, and such rotation will rotate the auxiliary propeller P in a direction counter to the rotation of the main propeller R. The pitches of the blades of the propellers R and P are opposed, as is quite apparent, in order that their efforts will be combined to the common end of propelling the aircraft thru the air. The propellers are preferably of the steel-blade type, and their blades are relatively adjustable as to pitch inclination.

An important feature of the invention is the fact that the main propeller R comprises a pair of opposed blades 120 and 121, whereas the auxiliary propeller P preferably comprises three or more blades 122, 123 and 124, preferably, although not necessarily, of less length than the propeller blades of the main propeller.

The efficiency of the motor is measured by the combined efforts of the propellers P and R. Due to relation in which they are arranged, however, torque is not only eliminated, but each of the propeller blades are given a slower relative speed than the effective speed of the motor. In some types of aircraft fore and aft propellers are provided on out-board motor arrangements with an internal combustion engine individually driving each of the propellers. My arrangement performs all of the functions of that idea with the elimination of one of the motors. In some of the larger motors reduction gears are provided to drive the propeller slower than normal engine speed. With my motor this reduction gearing is done away with.

The carburetor air intake 125 may have a choke valve controlled by a lever 126, as shown in Figure 2. This lever is controlled through a suitable cable 127 extending into the pilot's cabin. A fuel line 130 leads from the carburetor 50 to the fuel tanks, which may be in the wings or other approved location, either for gravity or force feed.

If desired, I may provide suitable cowling over the parts above described, to lessen head-on resistance.

In Figures 10 and 11 is shown a power plant quite similar to that of my co-pending application, but in which the motor F has an auxiliary propeller P' mounted on a hollow tube K' immediately to the rear of the motor F, by means of a ring-shaped mounting frame L' quite similar to the frame L above described. This eliminates many of the details of the arrangement set forth in my co-pending application. The motor F is of course provided with a crank shaft S' having a main propeller R' connected therewith. The main and auxiliary propellers R' and P' respectively are of the opposed two-bladed and three-bladed type respectively, as shown, with the pitch of the blades opposed for the purpose described. The hollow shaft K' is of course supported by a fuselage rigid frame H' having a bearing on the hollow shaft K' directly to the rear of the propeller P', as shown at 135 in Figure 11 of the drawings. The fuel is fed through the hollow shaft K' and exists therefrom at an annular casing 60', quite similar to the casing 60 for the tube K above described, and formed with means for connection to the motor F in the same relation.

Various changes in the shape, size, and arrangement of parts may be made to the forms of invention herein shown and described, without departing from the spirit of the invention or the scope of the claims.

I claim:

1. In aircraft of the class described the combination of a fuselage having supporting wing surfaces extending laterally therefrom, an out-board motor mounting frame connected with a wing laterally of the fuselage, a shaft rotatably supported by said frame laterally of the fuselage, an internal combustion engine including a casing, a crank shaft and main propeller keyed with the crank shaft and disposed for operation in a plane forwardly of the wing, means fixedly connecting the casing of the internal combustion engine with said first mentioned shaft so that the latter may rotate with the engine casing, an auxiliary propeller keyed with said first mentioned shaft and disposed for operation in a plane rearwardly of the wing, said main and auxiliary propellers having the blades thereof pitched in opposed relation, said auxiliary propeller having number of blades greater than the number of blades of the main propeller.

2. In an aircraft power plant the combination of a rotatable shaft, a receptacle symmetrically carried by said shaft, a frame for rotatably supporting said shaft upon an aircraft, an auxiliary propeller keyed with said shaft, an engine including a casing keyed with said shaft, a crank shaft for the engine rotatable therein independent of the first mentioned shaft, a main propeller keyed on the crank shaft, and means for feeding lubricant from said receptacle to the engine.

3. In an aircraft power plant the combination of a rotatable shaft, a receptacle symmetrically carried by said shaft, a frame for rotatably supporting said shaft upon an aircraft, an auxiliary propeller keyed with said shaft, an engine including a casing keyed with said shaft, a crank shaft for the engine rotatable therein independent of the first mentioned shaft, a main propeller keyed on the crank shaft, means for feeding lubricant from said receptacle to the engine, said means including pumps for pumping lubricant between said receptacle and the engine.

4. In a power plant for aircraft the combination of a rotatable shaft, an internal combustion engine having a casing keyed to said shaft, a lubricant receptacle concentric upon the shaft and having an annular chamber between the shaft and the receptacle outer walls, pump means carried by the receptacle including a gear rotatable therewith, a gear concentric with the shaft, means for holding the last mentioned gear stationary and in meshing relation with the pump gear whereby upon rotation of the shaft the pump will be operated for forcing lubricant from the receptacle, and means for receiving the pumped lubricant and transmitting it to said engine.

5. In a power plant for aircraft the combination of a frame, a hollow shaft rotatably supported by said frame, an auxiliary propeller keyed upon the shaft, an internal combustion engine including a casing connected with the shaft, a crank shaft for the engine having a main propeller keyed therewith, said shaft between said main and auxiliary propellers being transversely apertured, a stationary carburetor structure surrounding the apertured portion of said shaft for feeding fuel through the aperture into the hollow shaft, and means for taking the fuel from the hollow shaft and transmitting it to the internal combustion engine.

CHARLEY L. BROWN.